United States Patent
Coleman

(10) Patent No.: US 9,630,558 B2
(45) Date of Patent: Apr. 25, 2017

(54) DRIVER-RESPONSIVE DYNAMIC VEHICLE MIRROR SYSTEM

(71) Applicant: Steven Coleman, Miami, FL (US)

(72) Inventor: Steven Coleman, Miami, FL (US)

(*) Notice: Subject to any disclaimer, the term of this patent is extended or adjusted under 35 U.S.C. 154(b) by 0 days.

(21) Appl. No.: 14/755,881

(22) Filed: Jun. 30, 2015

(65) Prior Publication Data
US 2016/0176371 A1    Jun. 23, 2016

Related U.S. Application Data

(60) Provisional application No. 62/018,883, filed on Jun. 30, 2014.

(51) Int. Cl.
*B60R 1/00* (2006.01)
*B60R 1/02* (2006.01)
*B60R 1/072* (2006.01)

(52) U.S. Cl.
CPC .............. *B60R 1/006* (2013.01); *B60R 1/025* (2013.01); *B60R 1/072* (2013.01)

(58) Field of Classification Search
CPC .............................. B60R 16/037; B60R 22/00
See application file for complete search history.

(56) References Cited

U.S. PATENT DOCUMENTS

| | | | |
|---|---|---|---|
| 4,394,066 A * | 7/1983 | Sharp | B60R 1/06 248/475.1 |
| 6,193,380 B1 | 2/2001 | Jacobs | |
| 6,841,960 B2 * | 1/2005 | Yamada | B60R 1/07 318/466 |
| 6,927,894 B2 * | 8/2005 | Blum | B60R 1/08 359/319 |
| 7,354,166 B2 | 4/2008 | Qualich et al. | |
| 8,087,791 B2 * | 1/2012 | Okuda | B60R 1/02 359/843 |
| 8,282,226 B2 | 10/2012 | Blank et al. | |
| 8,489,284 B2 | 7/2013 | Emam et al. | |
| 8,702,250 B2 * | 4/2014 | Raz | B60R 1/07 359/843 |
| 8,874,313 B2 * | 10/2014 | Felkins | B60W 50/14 701/36 |
| 9,296,338 B2 * | 3/2016 | Kaplan | B60R 1/006 |
| 2002/0052680 A1 * | 5/2002 | Whitten | B60R 1/025 701/49 |
| 2010/0046104 A1 | 2/2010 | Rimac | |
| 2013/0258512 A1 * | 10/2013 | Raz | B60R 1/07 359/843 |
| 2013/0342926 A1 | 12/2013 | Lutz et al. | |
| 2015/0048643 A1 * | 2/2015 | Doan | B60R 11/02 296/97.5 |

* cited by examiner

*Primary Examiner* — Thomas Tarcza
*Assistant Examiner* — Alex C Dunn
(74) *Attorney, Agent, or Firm* — Global Intellectual Property Agency, LLC; Daniel Boudwin

(57) ABSTRACT

A driver-responsive dynamic mirror system for a vehicle. The present system includes a sensor that is configured to track the direction that the driver is facing and automatically adjust the orientation of the vehicle's mirrors in response to changes in the direction that the user is facing.

11 Claims, 7 Drawing Sheets

DRIVER-RESPONSIVE DYNAMIC VEHICLE MIRROR SYSTEM

CROSS REFERENCE TO RELATED APPLICATIONS

This application claims the benefit of U.S. Provisional Application No. 62/018,883 filed on Jun. 30, 2014. The above identified patent application is herein incorporated by reference in its entirety to provide continuity of disclosure.

FIELD OF THE INVENTION

The present invention relates to adjustable mirror systems for vehicles. More specifically, the present invention relates to a system of side and rear-view mirrors that is configured to detect the direction that the user's head is facing and automatically adjust the orientation of the mirrors in response thereto.

BACKGROUND OF THE INVENTION

Conventional side-view and rear-view mirrors of automobiles are set at a non-dynamic orientation or angle that is not adjustable when the automobile is in use. This forces drivers to pick a single orientation for each mirror that is generally usable across the different positions at which their heads can be disposed. However, the angle at which each of the mirrors is disposed can be non-ideal depending upon the position of the driver's head, which can lead to accidents other such problems on the road. Therefore, there is a need in the prior art for a system of vehicle mirrors that is configured to adjust the position of each mirror depending upon the position of the driver's head or the direction in which the user is facing.

SUMMARY OF THE INVENTION

In view of the foregoing disadvantages inherent in the known types of vehicle mirror systems now present in the prior art, the present invention provides a driver-responsive dynamic vehicle mirror system wherein the same can be utilized for providing convenience for the user when driving an automobile. The present system comprises a sensor that is configured to track the direction that the driver is facing and automatically adjust the orientation of the vehicle's mirrors in response to changes in the direction that the user is facing. The present system is configured to adjust the orientation of the mirrors of the vehicle, e.g. the side-view and rear-view mirrors, in the same direction that the driver is facing.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
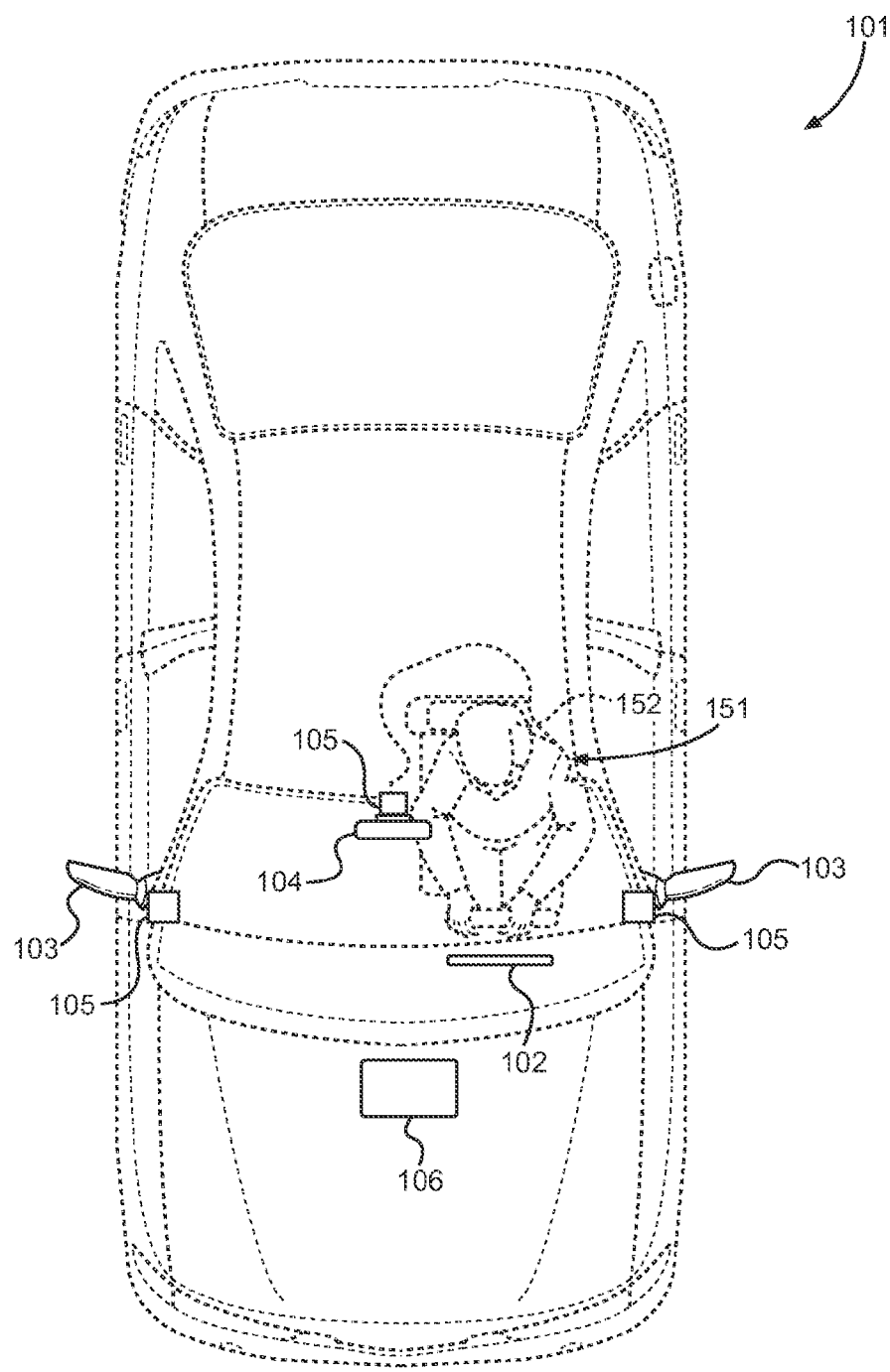
FIG. 1 shows a diagram of the present system.

Reference is made herein to the attached drawings. Like reference numerals are used throughout the drawings to depict like or similar elements of the driver-responsive dynamic vehicle mirror system. For the purposes of presenting a brief and clear description of the present invention, the preferred embodiment will be discussed as used for an automobile having side-view mirrors and a rear-view mirror. The figures are intended for representative purposes only and should not be considered to be limiting in any respect.

As used herein, "logic" refers to (i) logic implemented as computer instructions and/or data within one or more computer processes and/or (ii) logic implemented in electronic circuitry. As used herein, "computer-readable medium" excludes any transitory signals, but includes any non-transitory data storage circuitry, e.g., buffers, cache, and queues, within transceivers of transitory signals. In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

Referring now to FIG. 1, there is shown a diagram of the present system. An illustrative embodiment of the present invention comprises a vehicle, e.g. an automobile 101, having one or more adjustable mirrors, a driver-monitoring sensor 102 configured to monitor the facing direction 151 of the driver, i.e. the direction that the driver is facing, and a logic in communication with the sensor and the adjustable mirrors that moves the mirrors in response to movement of the head 152, i.e. a change in the facing direction, of the driver. For illustrative purposes only, the vehicle shown in FIGS. 1-2C is an automobile 101; however, there is no intent to limit the application of the present invention solely to automobiles.

The driver-monitoring sensor 102 is configured to continuously track the direction that the driver 151 is facing and relay that data to the logic, which is configured to then adjust the orientation of the mirrors of the vehicle in responses thereto. The driver-monitoring sensor 102 comprises a camera, a passive infrared sensor, an ultrasonic sensor, a microwave sensor, and other such sensors configured to detect and quantify movement. In one embodiment, the sensor 102 is configured to determine the direction in which the driver is facing by recognizing and tracking the movement of the driver's eyes. In another embodiment, the sensor 102 is configured to determine the direction in which the driver is facing by recognizing and tracking the user's overall face and detect when there is a change in the angle at which the head is disposed. In one embodiment, the driver-monitoring sensor 102 is attached to the pivot arm of a visor of the vehicle.

The vehicle with which the present system is in use has at least one mirror, e.g. a rear-facing mirror used to assist drivers 151 in seeing other vehicles and obstacles around and behind the vehicle when the vehicle is in operation. In an illustrative embodiment of the present invention, the vehicle comprises an automobile 101 having a pair of side-view mirrors 103 and a rear-view mirror 104. Each of the mirrors 103, 104 comprises a pivotable connection to the vehicle and a motor 105 configured to adjust the orientation of the mirror 103, 104 via the pivotable connection. In one embodiment, the pivotable connection is both horizontally and vertically adjustable.

The motors 105 are in communication with a computer 106, which comprises a processor, a memory, and a logic stored within the memory and executed by the processor. The computer 106 is also in communication with the driver-monitoring sensor 102. The computer 106 is configured to receive data from the driver-monitoring sensor 102 and activate the motors 105 of the mirrors 103, 104 to adjust the orientation of the mirrors 103, 104 in accordance with the detected position of the driver's head 152. In one embodiment of the present invention, the computer 106 is integral to the vehicle, i.e. is the vehicle's on-board computer. In a second embodiment of the present invention, the computer 106 is a separately installable into the vehicle and/or is a separate unit dedicated solely to the functionality of the present system.

Figure 2A:
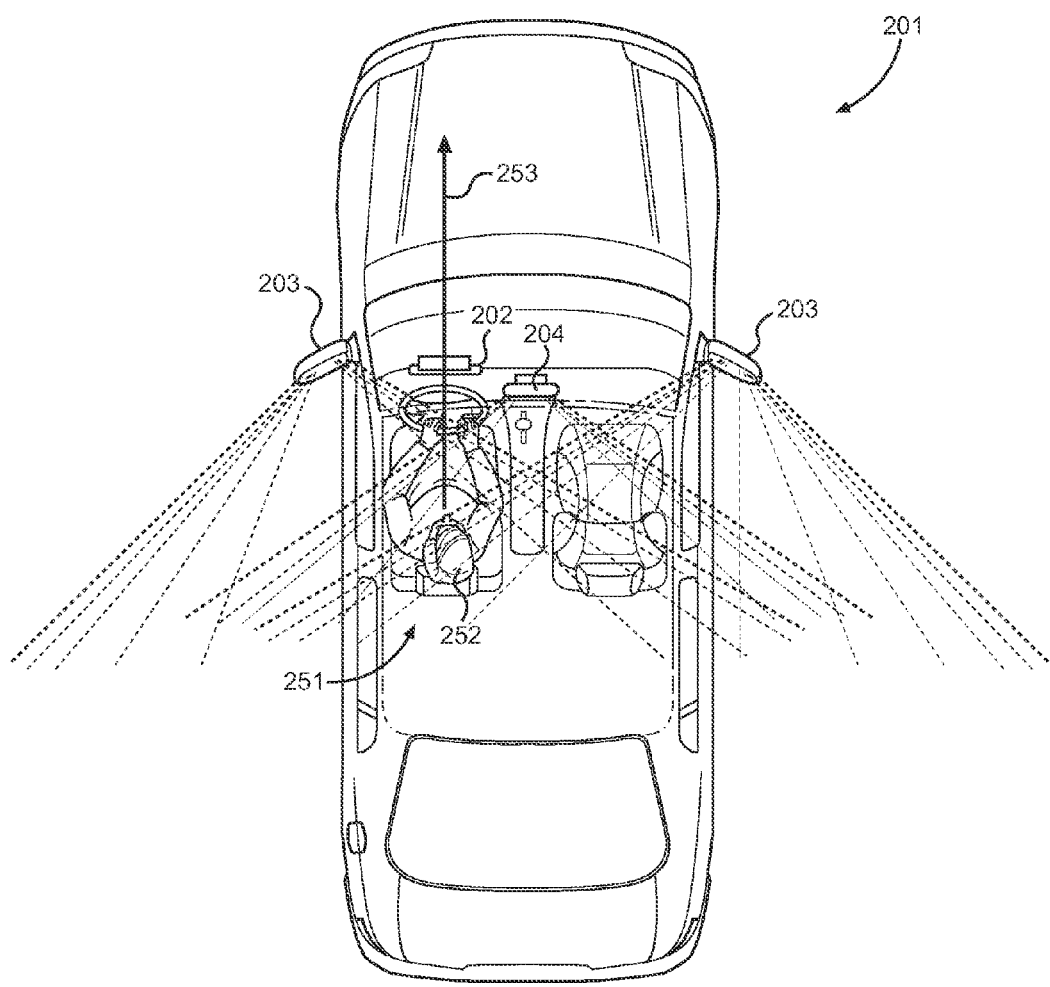
FIG. 2A shows a diagram of the orientation of the mirrors of the present system when the driver is facing forward.
Figure 2B:
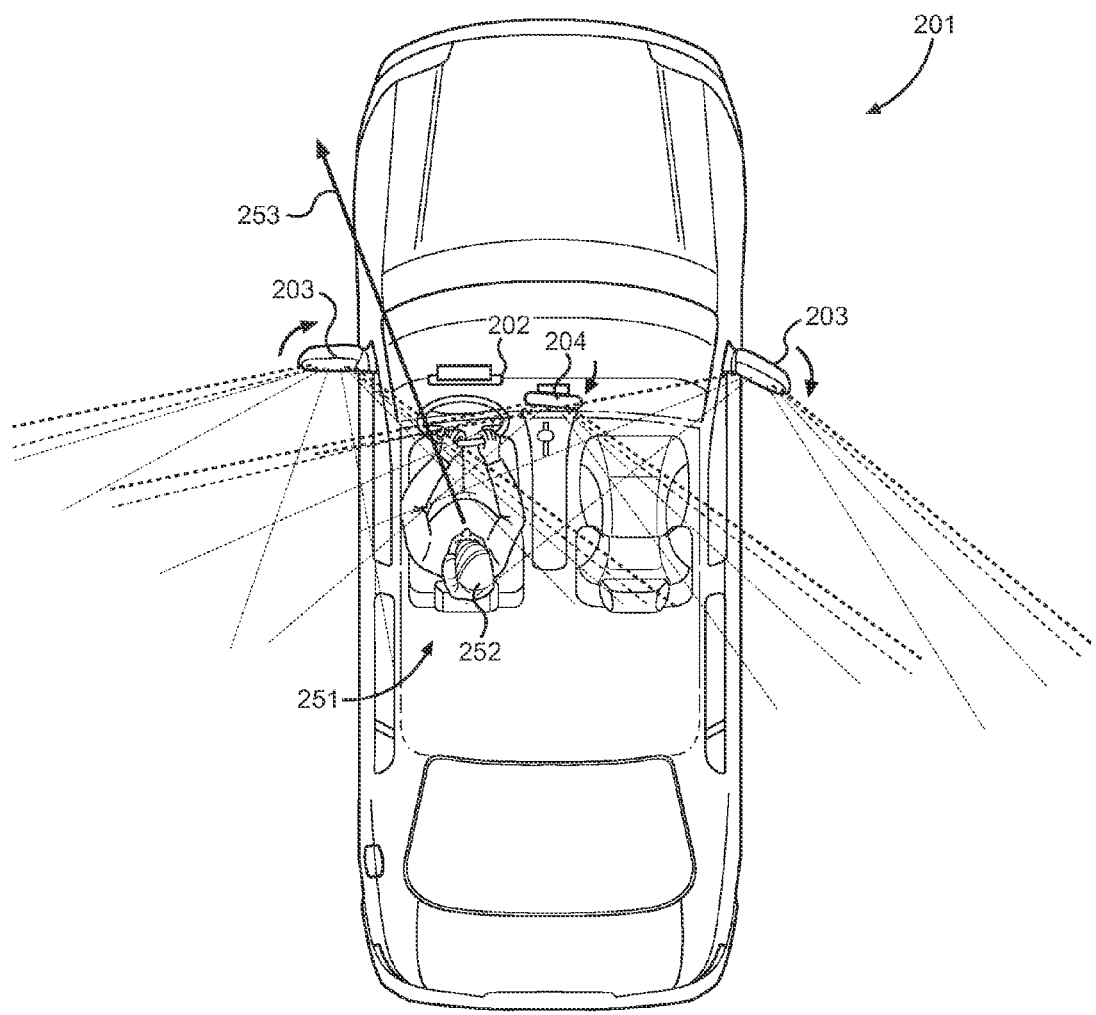
FIG. 2B shows a diagram of the orientation of the mirrors of the present system when the driver is facing to the left.
Figure 2C:
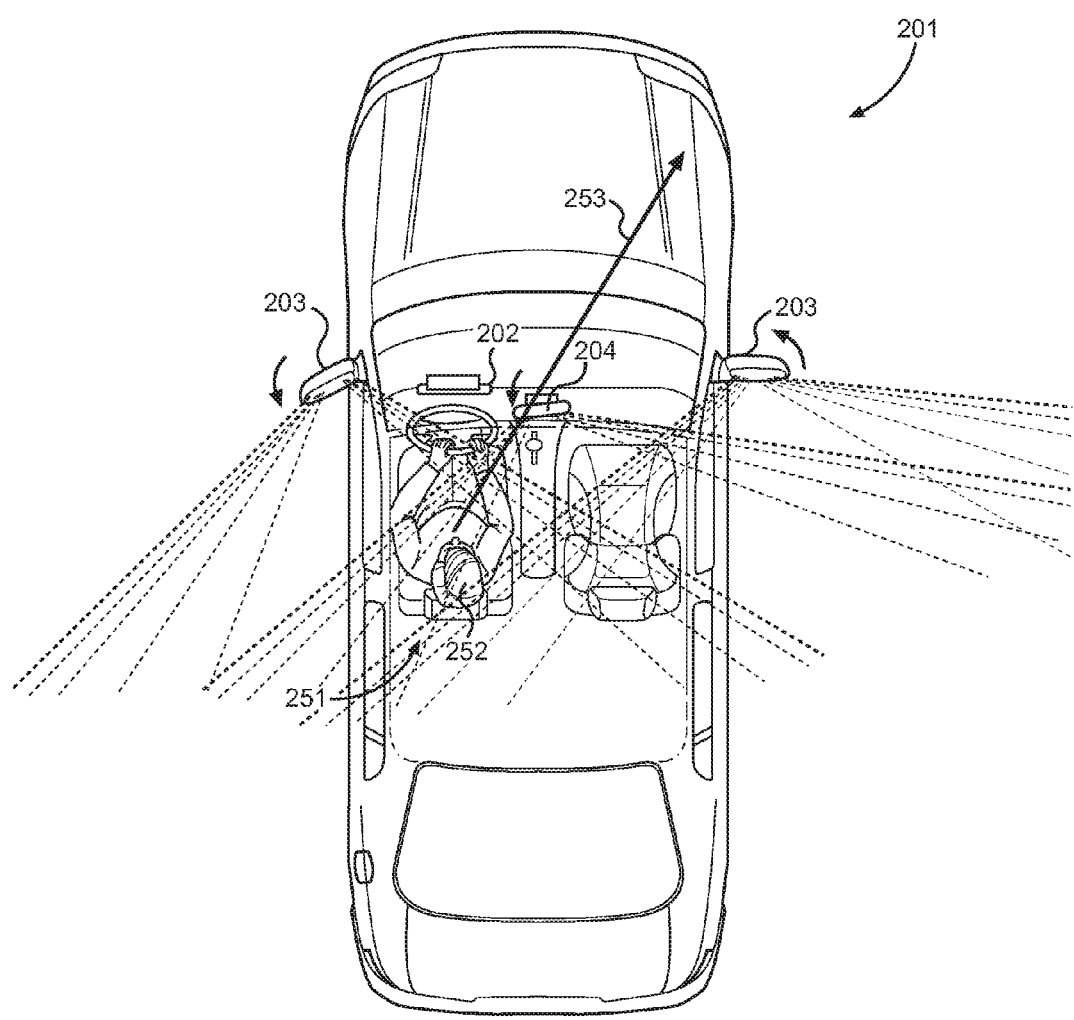
FIG. 2C shows a diagram of the orientation of the mirrors of the present system when the driver is facing to the right.

Referring now to FIGS. 2A-2C, there are shown diagrams of changes in the orientation of the mirrors of the present system based upon the direction that the driver is facing. In an embodiment of the present invention, the driver-monitoring sensor 202 is configured to detect the direction of movement of the head 252 of the driver 251 and then alter the orientation of the mirrors 203, 204 in conformity with the detected movement. For example, when the driver 251 faces to the left, as shown in FIG. 2B, then the mirrors 203, 204 also pivot to the left. Likewise, when the driver 251 faces to the right, as shown in FIG. 2C, then the mirrors 203, 204 also pivot to the right. When the user faces forward, as shown in FIG. 2A, then the mirrors 203, 204 remain in their default position. In one embodiment, the side-view mirrors 203 and the rear-view mirror 204 pivot in unison.

Although FIGS. 2A-2C show the function of the present system with respect to horizontal movement of the driver's head, i.e. a horizontal change in the direction that the driver is facing, it should be understood that the present system is likewise configured to react to vertical changes in the direction that the driver is facing in and adjust the vertical orientation of the mirrors 203, 204 in a similar manner as described above with respect to horizontal changes in the direction that the driver 251 is facing.

Figure 3:
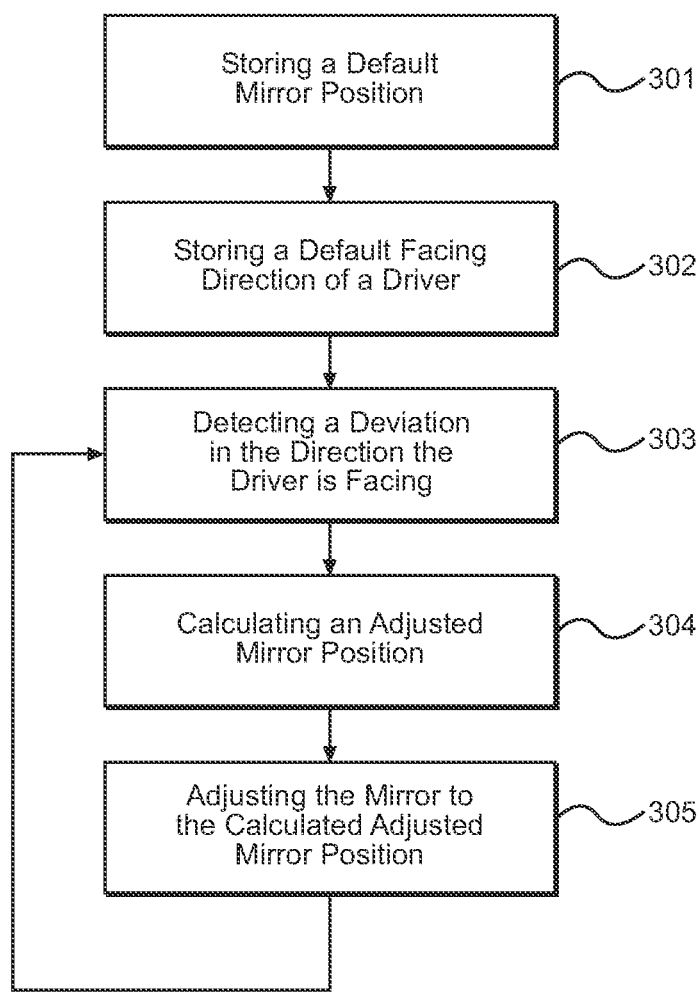
FIG. 3 shows a flowchart of the logic of the present system.

Referring not to FIG. 3, there is shown a flowchart of the logic of the present system. An illustrative embodiment of the logic of the present system first stores a default mirror position 301 associated with a default facing direction 302 of a driver. The default mirror position 301 can be independently set or programmed by a user and persistently stored within the memory for access by the logic. Alternatively, the logic can set the default mirror position 301 to be the orientation of the mirrors when the vehicle is activated. The default facing position 302 is also programmable by a driver. For example, the default facing position 302 will be set as facing forward; however, it is customizable for each driver. In one embodiment, different drivers can store different profiles on the present system, thereby allowing them to access their user-specific when driving so that the present system can conform to the individual needs of multiple different individuals that use the same vehicle with regularity.

Once the vehicle is activated, the present system then monitors the direction that the user is facing via the sensor. The sensor continuously monitors the orientation of the driver's face or head and transmits the data to the logic. When the logic determines that the direction that the driver is facing deviates 303 from the default facing direction, then the logic calculates an adjusted mirror position 304 for each of the mirrors of the present system. In an illustrative embodiment, the adjusted mirror position is calculated 304 by determining the magnitude of the deviation in the angle that the user is facing from the default facing direction. After calculating the adjusted mirror position 304, the logic activates the motors for each of the mirrors and adjusts the orientation of each of the mirrors 305 to the calculated positions.

After the mirrors are moved to the adjusted mirror position 305, the system then resumes tracking the direction that the driver is facing. If the direction that the user is facing deviates from the adjusted position, then the logic further adjusts the positions of the mirrors in the same manner as discussed above, i.e. the logic determines the magnitude of the deviation in the angle at which the user is facing as compared to the default position and then adjusts the mirrors to an angle corresponding to the detected magnitude. If the direction that the user is facing returns to the default facing direction, then the mirrors are likewise returned to the default mirror position. In one embodiment, the orientations of the mirrors are adjusted by the logic in unison.

Figure 4:
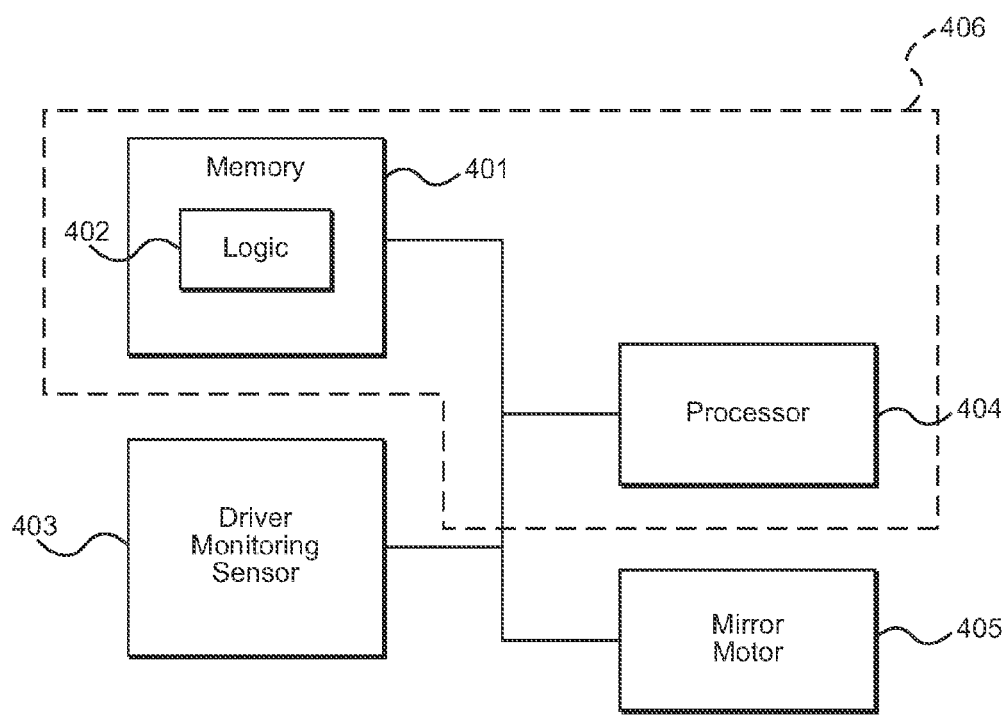
FIG. 4 shows a block diagram of the present system.

Referring now to FIG. 4, there is shown a block diagram of the present system. In one embodiment, the present system comprises a computer 406 having a memory 401, on which the logic 402 is stored, and a processor 404 operatively connected to the memory 401. When executed by the processor 404, the logic 204 implements the method steps as discussed above.

The computer 406 is operatively connected to the driver-monitoring sensor 403, which is, as discussed above, configured to track the direction that the driver is facing, and at least one mirror motor 405, which controls the orientation at which the mirror to which it is connected is disposed. The mirror motors 405 comprise any electromechanical motor known in the prior art. The computer 406 is connected to the driver-monitoring sensor 403 and the mirror motors 405 via a wired, e.g. electrical, connection or a wireless connection. In an embodiment of the present system wherein the computer 406 is wirelessly connected to the sensor 403 and motors 405, each of the components further comprises a wireless transceiver operatively connected thereto for sending data, signals, and/or commands between the components.

Figure 5:
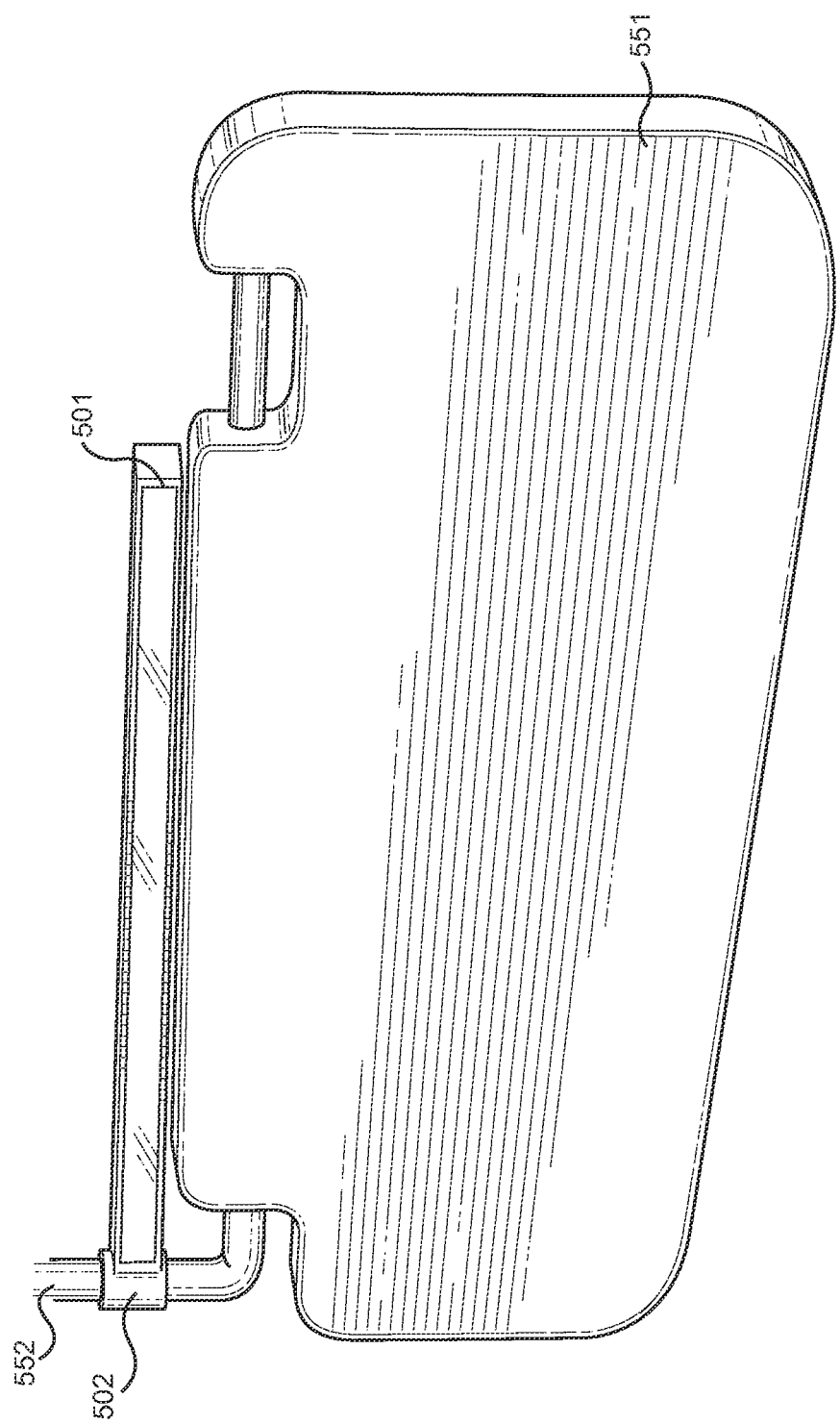
FIG. 5 shows a perspective view of the driver monitoring sensor.

Referring now to FIG. 5, there is shown a perspective view of the driver monitoring sensor. In one embodiment of the present system, the driver-monitoring sensor 501 is configured to be attached 502 to the pivot arm 552 of the driver-side visor 551. In this embodiment, the sensor 501 is pivotably attached 502 to the pivot arm 552 and independently adjustable from the visor 551, thereby allowing the position of the visor 551 to be adjusted without impacting the sensor 501.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A driver-responsive vehicle mirror system, comprising:
a processor;
a non-transitory computer readable medium operatively connected to the processor;
a driver-monitoring sensor;
at least one vehicle mirror;
wherein the driver-monitoring sensor extends from a pivot arm of a visor and is independently pivotable therefrom;
a logic stored in the non-transitory computer readable medium that, when executed by the processor, causes the driver-responsive vehicle mirror system to perform a method, the method comprising the steps of:
   detecting a facing direction of a driver via the driver-monitoring sensor;
   adjusting an orientation of each of the at least one vehicle mirror such that the orientation of each of the at least one vehicle mirror corresponds to the facing direction.

2. The driver-responsive vehicle mirror system of claim 1, wherein the at least one vehicle mirror comprises a first side-view mirror, a second side-view mirror, and a rear-view mirror.

3. The driver-responsive vehicle mirror system of claim 1, wherein the driver-monitoring sensor comprises a camera.

4. The driver-responsive vehicle mirror system of claim 1, wherein the logic adjusts the orientation of each of the at least one vehicle mirror in unison.

5. The driver-responsive vehicle mirror system of claim 1, wherein each of the at least one vehicle mirror further comprises:
   a pivotable connection to a vehicle;
   a motor configured to adjust the orientation of each of the at least one vehicle mirror.

6. A driver-responsive vehicle mirror system, comprising:
a processor;
a non-transitory computer readable medium operatively connected to the processor;
a driver-monitoring sensor;
at least one vehicle mirror;
wherein the driver-monitoring sensor extends from a pivot arm of a visor and is independently pivotable therefrom;
a logic stored in the non-transitory computer readable medium that, when executed by the processor, causes the driver-responsive vehicle mirror system to perform a method, the method comprising the steps of:
   storing a default mirror position;
   storing a default facing direction of a driver; detecting a deviation in a facing direction of the driver from the default facing direction;
   calculating an adjusted mirror position for each of the at least one vehicle mirror;
   adjusting each of the at least one vehicle mirror to each adjusted mirror position.

7. The driver-responsive vehicle mirror system of claim 6, wherein each adjusted mirror position is calculated by: calculating an angle between the default facing direction and the facing direction; calculating an adjusted mirror position corresponding to a magnitude of the angle.

8. The driver-responsive vehicle mirror system of claim 6, wherein the at least one vehicle mirror comprises a first side-view mirror, a second side-view mirror, and a rear-view mirror.

9. The driver-responsive vehicle mirror system of claim 6, wherein the driver-monitoring sensor comprises a camera.

10. The driver-responsive vehicle mirror system of claim 6, wherein the logic adjusts the orientation of each of the at least one vehicle mirror in unison.

11. The driver-responsive vehicle mirror system of claim 6, wherein each of the at least one vehicle mirror further comprises:
   a pivotable connection to a vehicle;
   a motor configured to adjust the orientation of each of the at least one vehicle mirror.

* * * * *